United States Patent Office

2,764,577
ADDITION OF ISOPRENE TO RESIN FEED STREAMS IN CONTINUOUS PROCESS

Addison W. Hubbard, Elizabeth, Robert F. Leary, Cranford, and Fred W. Banes, Westfield, N. J., assignors to Esso Research and Engineering Company, a corporation of Delaware No Drawing. Application March 18, 1953, Serial No. 343,244

6 Claims. (Cl. 260—82)

This invention relates to a novel process for improving the quality of petroleum hydrocarbon resins and, more particularly, to a continuous process in which petroleum resins are improved by the addition to the feed streams of limited amounts of isoprene under critical conditions.

Hydrocarbon resins can be produced from certain unsaturated petroleum refinery streams containing mixtures of olefins and diolefins by such methods as polymerization using Friedel-Crafts catalysts. The steam cracked distillates have been found especially useful for this purpose.

Such distillates are prepared by cracking petroleum fractions as kerosene, gas oil, naphtha or residua in the presence of 50 to 90 mole per cent steam at temperatures of about 1000° F. to 1600° F. The liquid cut boiling largely below $C_9$ is segregated and heated at about 90 to 140° C. to dimerize cyclopentadienes. Thereafter a $C_8$ to $C_9$ and lighter liquid cut including $C_5$ is taken overhead and there is separated a dimer concentrate as bottoms. All, or a major portion, of this overhead stream is topped to about 38° C. to remove a dilute isoprene fraction. The bottoms from this topping operation, together with any untopped material which by-passes this distillation, is used as the basic polymerization feed.

Although the isoprene containing cut, having a boiling range from the initial boiling point up to +38° C. is an undesirable component in steam cracked distillate streams to be used for resin manufacture, isoprene itself or a concentrate containing more than 50% isoprene contributes greatly to quality and yield of resin products when it is present in the resin feed. But, despite the improved yield and higher softening point, the isoprene gives gelled resin products when added into batch type reactions.

It has now been found, however, that if a quantity of 50% or higher purity isoprene is added to the reaction mixture and the polymerization is carried out in a continuous manner, improved resin yields are obtained. Furthermore, the resins obtained have higher softening points than are realized when the isoprene is not present in the reaction mixture. The resin products are completely soluble and contain no insoluble gel. In order to achieve this combination of improved effects, it is necessary and critical that the polymerization be carried out in a continuous manner. The isoprene which is added should be of at least 50% purity.

Hydrocarbon resins to which the present invention is applicable are made by treating a hydrocarbon mixture containing diolefins, olefins, aromatics, paraffins, and naphthenes with about 0.25 to 3.0%, based on the unsaturated hydrocarbon feed, of an aluminum halide catalyst such as aluminum chloride and aluminum bromide. The catalysts may be used as solids or they may be employed as solutions, slurries or complexes. Hydrocarbon complexes of the catalysts, obtained by reaction of the aluminum halide with a resin raffinate containing about 60% olefins and 40% aromatics, are also quite useful.

Typical hydrocarbon fractions useful for feeds in making these resins boil from 20° to 170° C. Analyses show the following composition:

Distillation range:

| Fraction, ° C.— | Weight percent |
|---|---|
| 20–70 | 0–60 |
| 70–130 | 65–40 |
| 130–170 | 35–0 |

Composition:

| | |
|---|---|
| Diolefins | 8–20 |
| Aromatics | 19–49 |
| Olefins | 68–30 |
| Paraffins and naphthenes | 5–1 |

The hydrocarbon stream used as feed stock should be one from which substantially all the isoprene-containing cut has been initially removed, since the presence of this total cut during polymerization increases the amount of undesirable liquid polymer product although the presence of restricted amounts of isoprene does not give such effects when operating in a continuous manner.

The polymerization reactions are conducted at temperatures in the range of −30 to +90° C. and preferably from +5° to +75° C. Generally, the amount of isoprene containing material added should be restricted to correspond or be equivalent to from 5% up to not more than 20% of isoprene based on the total feed mixture. Subject to this limitation, the isoprene may be used as a concentrate of 50% or higher purity.

In carrying out the continuous operation, the reactor is preferably charged with an unsaturated naphtha substantially free of isoprene. The agitator is started and catalyst addition begun and continued over a ½ to 1 hour period until the desired catalyst concentration and conversion to resin have been reached in the reactor contents. The reaction temperature is maintained by circulating the contents of the reactor continually through a cooling (or heating) bath. After the desired catalyst concentration has been reached, the isoprene-naphtha blend is admitted to the reactor at a rate that will give a hold-up time of ½ to 1 hour or longer within the reactor. At the same time, catalyst addition is started and maintained at a rate to give the desired catalyst concentration based on the hydrocarbon feed. Part of the reaction solution is conveniently drawn off continually to a second agitated reactor which is maintained at about the same (or higher or lower) temperature as the first reactor. This second vessel provides for additional contact time. Product from this second reactor vessel can be withdrawn batchwise or continuously to quenching and washing operations and ultimately to the stripper where the final resin product is recovered.

The essential features of the invention are illustrated by the following examples although it is not intended to limit the invention specifically thereto.

EXAMPLE 1

A representative steam cracked distillate boiling in the approximate range of 35 to 145° C. and containing about 15% conjugated diolefins, 24% aromatics, 60% olefins and 1% paraffins and naphthenes was polymerized alone and in combination with varying amounts of isoprene. The results of batch polymerizations under several conditions of operation are presented in Table I.

To carry out the batch polymerizations, the olefinic feed is contacted with catalyst at the indicated temperature. The catalyst is added over a ¼ to one hour period. After completion of catalyst addition, the reaction is agitated at this temperature for an additional ½ to 1 hour. The product is then quenched with 5% (aqueous) $H_2SO_4$, and water and/or caustic washed thoroughly. The washed resin solution is then stripped to give the hard resin product. The stripping may be carried out by vacuum or steam distillation. For example, hard resins are conveniently recovered by stripping to a bottoms temperature of about 270° C. at 2–5 mm. Hg or the solutions can be steam stripped for about 2 hours at 260° C. Within limits, higher softening point resins may usually be obtained by increasing the severity and/or time of stripping but only at a sacrifice in resin yield and a corresponding increase in liquid polymer yield.

It also falls within the scope of this invention that a single reactor may be employed or that more than one reactor vessel may be used. In other words, the reactor may involve a single or multiple stage continuous system.

*Table I*

BATCH POLYMERIZATIONS

| Wt. Percent on Total Feed | | Reaction Temp., °C. | Wt. Percent AlCl₃ | Wt. Percent Yield | | Liquid Polymer | Resin Properties | |
|---|---|---|---|---|---|---|---|---|
| Naphtha | Isoprene | | | Resin | Gel | | Soft. Point, °C.[1] | Color[2] |
| 100 | ------ | 20–25 | 1.0 | 35.6 | None | 4.5 | 87 | 2 |
| 100 | ------ | 20–25 | 2.0 | 34.5 | None | 5.9 | 90 | 3–4 |
| 95 | 5 | 20 | 3.0 | 41.7 | 0.5 | 7.5 | 90 | 4 |
| 90 | 10 | 45 | 1.0 | 44.2 | 4.0 | 3.5 | 93 | 1 |
| 80 | 20 | 60–65 | 0.5 | 47.2 | 12.0 | 5 | 101 | 2 |

[1] Ring and ball method (ASTM E-28-51-T).
[2] Color of a solution of 1 gm. of resin in 67 ml. of xylenes compared to Gardner color index.

As shown by these batch polymerizations, a substantial improvement in resin yield and softening point can be realized by adding isoprene to the naphtha feed. However, this advantage is totally offset by the production of insoluble product (gel) which fouls the reactor and transfer lines of the batch reaction equipment. This gelled material is also difficult to remove from the resin solution by filtration.

EXAMPLE 2

When the hydrocarbon feeds described in Example 1 were polymerized continuously using the operation described in detail above, even higher yields of high softening point resins were obtained and no gel or insoluble products were obtained in any case. There is also a noticeable and distinct improvement in the color of the product resins. The results of the continuous runs are summarized below in Table II. The amount of liquid polymer is not substantially increased by using the continuous method.

*Table II*

CONTINUOUS POLYMERIZATIONS

| Wt. Percent on Total Feed | | Catalyst | | Reaction Temp., °C. | Wt. Percent Yield on Total Feed | | | Resin Properties | |
|---|---|---|---|---|---|---|---|---|---|
| Naphtha | Isoprene | Type | Wt. Percent on Feed | | Resin | Gel | Liquid Polymer | Soft. Pt., °C. | Color |
| 100 | None | AlCl₃ | 1.0 | 45 | 35.6 | None | 5.7 | 90 | 2 |
| 95 | 5 | AlCl₃ | 3.0 | 15 | 44.7 | None | 6.7 | 88.5 | 1 |
| 90 | 10 | AlCl₃ | 1.0 | 45 | 47.5 | None | 6.8 | 92.5 | 1 |
| 80 | 20 | AlCl₃ | 0.5 | 68 | 53.2 | None | 5.8 | 103 | 1 |

EXAMPLE 3

In another series of runs a steam cracked distillate was employed which boiled in the range of about 25 to 140° C. This naphtha contained about 20 wt. % diolefins, 51% olefins, 26% aromatics and 3% paraffins and naphthenes. This naphtha and a blend containing 90% naphtha and 10% isoprene were polymerized in both batch and continuous systems using different catalysts, catalyst concentrations and reaction times. The resulting data, summarized in Table III, illustrate the advantages of using isoprene in conjunction with the naphtha in a continuous process.

However, in batch systems, the use of isoprene gives rise to undesirable gel formation. This is avoided and at the same time even higher resin yields are obtained by a continuous polymerization process. Continuous polymerization together with the use of isoprene gives lighter colored resins than are produced in other systems.

*Table III*

| Wt. percent on Total Feed | | Polymerization | | | Catalyst | |
|---|---|---|---|---|---|---|
| Naphtha | Isoprene | Type | Temp., °C. | Reaction Time, Hrs. | Type | Wt. percent on Total Feed |
| 100 | 0 | Batch | 25 | 2 | AlCl₃ | 1.0 |
| 100 | 0 | Cont. | 45 | 2 | AlBr₃ | 1.0 |
| 90 | 10 | Batch | 30 | 1 | AlBr₃ | [1]1.5 |
| 90 | 10 | Cont. | 30 | 2 | AlBr₃ | [1]1.5 |

| Wt. percent on Total Feed | | | Resin Properties | |
|---|---|---|---|---|
| Resin | Gel | Liquid Polymer | Soft. Point, °C. | Color |
| 36.4 | None | 5 | 90 | 4 |
| 37.9 | None | 5 | 90 | 3 |
| 37.6 | 1 | 4 | 107 | 4–5 |
| 41.6 | None | 5.4 | 107 | 2 |

[1] Added as a 5% solution in n-hexane.

EXAMPLE 4

In another series of experiments, isoprene concentrates containing 60 to 75% isoprene were blended with a naphtha similar in composition to that described in Example 3. The impurities in the isoprene concentrates were largely C₅ olefins, such as 1-pentene, 2-methyl-1-butene, 2-methyl-2-butene, 3-methyl-1-butene and 2-pentene, and minor quantities of C₅ paraffins. The blends were polymerized in both batch and continuous systems at 45° C.

using 1% AlCl₃ in each case as the catalyst. Experimental data, summarized in Table IV show that isoprene concentrates containing as little as 60% isoprene can be used in a continuous system to give high yields of light colored, high softening point resin. By contrast blends of 60 or 75% isoprene concentrate and naphtha containing 6 to 20% isoprene give undesirable gel formation when polymerized in batch systems.

Table IV

| Wt. Percent of Total Feed | | | Type of Polymerization |
|---|---|---|---|
| Naphtha | 75% Isoprene Concentrate | 60% Isoprene Concentrate | |
| 100 | 0 | 0 | Batch |
| 73.3 | ¹ 26.7 | 0 | Batch |
| 90 | 0 | 10 | Batch |
| 66.7 | 0 | ¹ 33.3 | Batch |
| 100 | 0 | 0 | Cont. |
| 66.7 | 0 | ¹ 33.3 | Cont. |

| Wt. Percent Yield on Feed | | | Resin Properties | |
|---|---|---|---|---|
| Resin | Gel | Liquid Polymer | Soft. Point, °C. | Color |
| 35.4 | None | 5.4 | 93 | 4 |
| 35.5 | 17.3 | 3.1 | 102 | 4 |
| 38.8 | ~1.0 | 5.2 | 98 | 3-4 |
| 38.5 | 13.5 | 4.3 | 99 | 3 |
| 36.1 | None | 5.7 | 95 | 3 |
| 50.8 | None | 5.9 | 100 | 1 |

¹ Equivalent to 20% isoprene on total feed.

What is claimed is:

1. A continuous process for the preparation of petroleum resins which comprises distilling a steam-cracked petroleum stream boiling from 20 to 170° C. to separate overhead a fraction boiling up to 38° C. containing all the isoprene, then adding to the non-separated portion boiling above 38° C. a mixture of C₅ olefins containing at least 50 weight precent of isoprene in an amount such that at least 5 weight percent up to not more than 20 weight percent of pure isoprene is present, based on the total polymerization feed mixture and then polymerizing the mixture in a continuous manner with an aluminum halide catalyst at a temperature between —30 and +90° C. by the continuous addition of the olefinisoprene feed at a rate that will give a holdup time of at least ½ to 1 hour within the reactor and continuously withdrawing product therefrom.

2. A continuous process for the preparation of petroleum resins which comprises heating a stream-cracked petroleum stream boiling from 20 to 170° C. and containing diolefins, olefins, aromatics, paraffins, and naphthenes to a temperature between 90 and 140° C. to dimerize the cyclopentadienes, separating and distilling the nondimerized portion to obtain overhead a fraction boiling up to 38° C. containing all the isoprene, then adding to the non-separated portion boiling above 38° C. a mixture of C₅ olefins containing at least 50 weight percent of isoprene in an amount such that at least 5 weight percent up to not more than 20 weight percent of pure isoprene is present based on the total polymerization feed mixture and then polymerizing the mixture in a continuous manner with an aluminum halide catalyst at a temperature between —30° C. and +90° C. by the continuous addition of the olefin-isoprene feed at a rate that will give a holdup of at least ½ to 1 hour within the reactor and continuously withdrawing product therefrom.

3. A process according to claim 2 in which the catalyst is aluminum chloride.

4. A process according to claim 2 in which the catalyst is aluminum bromide.

5. A process according to claim 3 in which the amount of catalyst is between 0.25 and 3.0 percent.

6. A process for the preparation of petroleum resins which comprises distilling a steam-cracked petroleum stream boiling from 20° to 170° C. to separate overhead a fraction boiling up to 38° C. containing all the isoprene, then commencing polymerization of the non-separated portion boiling above 38° C. in the presence of aluminum halide catalyst and continuing the addition of catalyst until the desired catalyst concentration and conversion to resin have been reached, thereafter adding to the reacting mixture C₅ olefins containing at least 50 weight percent of isoprene in an amount such that at least 5 weight percent up to not more than 20 weight percent of isoprene is present based on the total polymerization feed mixture to give a holdup time of at least ½ hour within the reaction zone and continuing the polymerization at a temperature between —30 and +90° C. in the presence of the catalyst while continually withdrawing product from the reaction zone.

References Cited in the file of this patent

UNITED STATES PATENTS 1,982,708    Thomas et al. _____ Dec. 4, 1934